United States Patent
Ishii et al.

(10) Patent No.: US 9,101,797 B2
(45) Date of Patent: Aug. 11, 2015

(54) GOLF BALL INCLUDING A BLEND OF HIGHLY NEUTRALIZED ACID POLYMERS AND METHOD OF MANUFACTURE

(75) Inventors: Hideyuki Ishii, Portland, OR (US);
Yasushi Ichikawa, Tualatin, OR (US);
Arthur Molinari, Portland, OR (US);
Chien-Hsin Chou, Yun-lin Hsin (TW);
Chen-Tai Liu, Yun-lin Hsien (TW)

(73) Assignee: NIKE, Inc., Beaverton, OR (US)

( * ) Notice: Subject to any disclaimer, the term of this patent is extended or adjusted under 35 U.S.C. 154(b) by 164 days.

(21) Appl. No.: 13/552,309

(22) Filed: Jul. 18, 2012

(65) Prior Publication Data

US 2013/0184102 A1 Jul. 18, 2013

Related U.S. Application Data

(60) Provisional application No. 61/512,735, filed on Jul. 28, 2011.

(51) Int. Cl.
*A63B 37/00* (2006.01)
*C08L 23/08* (2006.01)

(52) U.S. Cl.
CPC ......... *A63B 37/0051* (2013.01); *A63B 37/0032* (2013.01); *A63B 37/0047* (2013.01); *A63B 37/0059* (2013.01); *A63B 37/0061* (2013.01); *A63B 37/0063* (2013.01); *A63B 37/0064* (2013.01); *A63B 37/0065* (2013.01); *A63B 37/0066* (2013.01); *A63B 37/0069* (2013.01); *A63B 37/0086* (2013.01); *A63B 37/0087* (2013.01); *A63B 37/0091* (2013.01); *C08L 23/0876* (2013.01); *A63B 37/0074* (2013.01); *A63B 37/0075* (2013.01); *A63B 37/0076* (2013.01)

(58) Field of Classification Search
CPC .............. C08L 23/0876; A63B 37/005; A63B 37/0059; A63B 37/0061; A63B 37/00691
USPC ......... 473/351, 357, 361, 363, 364, 370–374, 473/376, 377
See application file for complete search history.

(56) References Cited

U.S. PATENT DOCUMENTS

| | | | |
|---|---|---|---|
| 5,733,428 A * | 3/1998 | Calabria et al. | 264/134 |
| 5,752,889 A | 5/1998 | Yamagishi et al. | |
| 5,779,562 A * | 7/1998 | Melvin et al. | 473/373 |
| 5,876,294 A | 3/1999 | Yamagishi et al. | |

(Continued)

FOREIGN PATENT DOCUMENTS

WO    WO9500212    1/1995

OTHER PUBLICATIONS

International Search Report and Written Opinion in PCT Application No. PCT/US2012/047702, mailed on Feb. 28, 2013.

(Continued)

*Primary Examiner* — John E Simms, Jr.
(74) *Attorney, Agent, or Firm* — Honigman Miller Schwartz & Cohn LLP; Anna M. Budde; Jonathan P. O'Brien

(57) ABSTRACT

A golf ball having a core layer, a mantle layer enclosing the core layer, and a cover layer enclosing the mantle layer. At least one of the layers includes a blend of at least two highly neutralized acid polymers having low flexural moduli. The relative proportion of one highly neutralized acid polymer to the other highly neutralized acid polymer is between about 10:90 and about 90:10.

16 Claims, 1 Drawing Sheet

(56) References Cited

U.S. PATENT DOCUMENTS

| | | | |
|---|---|---|---|
| 5,994,472 A | 11/1999 | Egashira et al. | |
| 6,653,382 B1* | 11/2003 | Statz et al. | 524/400 |
| 6,712,719 B2 | 3/2004 | Iwami | |
| 7,207,903 B2 | 4/2007 | Sullivan et al. | |
| 7,344,455 B1 | 3/2008 | Higuchi et al. | |
| 7,354,357 B2 | 4/2008 | Sullivan et al. | |
| 7,654,917 B2 | 2/2010 | Sullivan et al. | |
| 2003/0032502 A1 | 2/2003 | Lee et al. | |
| 2003/0100384 A1 | 5/2003 | Nesbitt | |
| 2003/0144087 A1* | 7/2003 | Rajagopalan et al. | 473/371 |
| 2005/0159524 A1 | 7/2005 | Rajagopalan et al. | |
| 2005/0288446 A1* | 12/2005 | Zieske et al. | 525/330.2 |
| 2006/0063893 A1 | 3/2006 | Rajagopalan | |
| 2006/0105858 A1* | 5/2006 | Kennedy et al. | 473/371 |
| 2006/0128904 A1* | 6/2006 | Sullivan et al. | 525/386 |
| 2006/0172823 A1* | 8/2006 | Loper et al. | 473/371 |
| 2006/0189413 A1* | 8/2006 | Boehm et al. | 473/371 |
| 2007/0129172 A1* | 6/2007 | Cavallaro | 473/371 |
| 2008/0220906 A1 | 9/2008 | Sullivan et al. | |
| 2009/0247323 A1* | 10/2009 | Rajagopalan et al. | 473/373 |
| 2010/0179001 A1* | 7/2010 | Cheng et al. | 473/374 |
| 2010/0190580 A1* | 7/2010 | Higuchi et al. | 473/373 |
| 2010/0216574 A1* | 8/2010 | Umezawa et al. | 473/377 |
| 2011/0028246 A1 | 2/2011 | Kimura | |

OTHER PUBLICATIONS

First Office Action in Chinese Utility Model Patent Application No. 201220370337.8, issued on Dec. 19, 2012.

Extended European Search Report Application No. 12817770.6 dated Feb. 2, 2015.

* cited by examiner

US 9,101,797 B2

GOLF BALL INCLUDING A BLEND OF HIGHLY NEUTRALIZED ACID POLYMERS AND METHOD OF MANUFACTURE

CROSS REFERENCE TO RELATED APPLICATION

This application claims priority under 35 U.S.C. §119(e) to U.S. Provisional Patent Application No. 61/512,735, entitled "GOLF BALL INCLUDING A BLEND OF HIGHLY NEUTRALIZED ACID POLYMERS AND METHOD OF MANUFACTURE", and filed on Jul. 28, 2011, which application is hereby incorporated by reference.

BACKGROUND OF THE INVENTION

1. Field of the Invention

The present invention relates to a golf ball including a blend of highly neutralized acid polymers. The invention also relates to a method of manufacturing products, particularly golf balls, including a blend of highly neutralized acid polymers.

2. Description of Related Art

Golf balls are important sporting goods that have changed with changes in technology. For example, balls were first made of wood, and then by stuffing boiled, softened feathers into a leather sack. The sack typically was painted white, and would tighten upon drying. However, because the feather ball tended to absorb moisture and to split, many balls were required to play a round. Also, these feather balls were expensive as compared with wooden balls.

Both feather and wooden balls were in use until the gutta percha ball was made. The gutta percha ball was relatively inexpensive and easily manufactured. Also, the gutta percha ball was fairly durable, as compared with the feather ball, performed well because the surface could easily be roughened to improve flight characteristics, and so became popular. However, the ball exhibited a tendency to break up in flight.

Golf balls comprising other elastic materials then were developed. For example, a golf ball having a rubber core and an elastic thread wound tightly around the core was developed. The winding was covered with gutta percha at first, but later with balata. However, balata-covered golf balls often are damaged by players who are less skilled at striking the ball. Thus, tougher covers were developed, including in particular covers comprising a Surlyn® compound or a polyurethane compound.

The interior structure of the golf ball also has advanced, with plastics and polymeric materials having properties and characteristics appropriate for manufacture of high-quality, high-performance, affordable golf balls. In particular, polymeric materials having properties and characteristics appropriate for golf ball manufacture have been developed. Such polymeric materials include polyurethanes and ionomeric materials, including highly neutralized acid polymers. Blended materials also are used to manufacture other products.

Blends of materials often are used to obtain properties and characteristics of golf balls and other products, which properties and characteristics may not be available from a single material. In particular, because golfers have different skill levels, and because golfers, particularly skilled players, often exhibit a preference for a product that is tuned to their style of play, swing, strengths and weaknesses, and other criteria, there exists a need to provide a golf ball suitable for varied skill levels and preferences.

Therefore, there exists a need for a golf ball comprising a layer having properties and characteristics obtained by blending polymeric materials. Further, there exists a need for method of manufacturing products, particularly golf balls, including a blend of highly neutralized acid polymers.

SUMMARY OF THE INVENTION

In an aspect, the invention relates to a golf ball comprising a blend of highly neutralized acid polymers. The golf ball has a core layer, a mantle layer essentially enclosing the core layer, and a cover layer essentially enclosing the mantle layer. The golf ball includes a blend of at least first and second highly neutralized acid polymers, each having a low flexural modulus.

In another aspect, the invention relates to a method of manufacturing a product, particularly a golf ball, comprising a blend of highly neutralized acid polymers. In particular, the invention relates to a method of manufacturing a golf ball comprising a blend of highly neutralized acid polymers, each having a low flexural modulus, including adjusting the properties and characteristics of the golf ball by controlling the proportions of the highly neutralized acid polymers of the blend.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Generally, the invention relates to a golf ball including a blend of highly neutralized acid polymers. The invention also relates to a method of manufacturing a golf ball comprising a blend of highly neutralized acid polymers. In particular, the invention relates to a method of manufacturing a golf ball comprising a blend of highly neutralized acid polymers including controlling the relative proportions of the highly neutralized acid polymers in the blend.

In another aspect, the invention relates to a method for customizing a golf ball and adjusting the properties and characteristics of the golf ball to suit a user by controlling the relative proportions of the highly neutralized acid polymers in the blend.

Golfers seek to maximize flight performance for driver shots while retaining control for iron shots. Thus, a core with high resilience typically is sought after, as the resilience of the core is a significant contributor to flight performance. However, the balance between flight performance properties and characteristics and control properties and characteristics typically differs among golfers. Thus, golfers, particularly skilled golfers, often obtain customized balls.

A high coefficient of restitution (COR) provides high resilience and good flight performance. The inventors have discovered that a high COR can be imparted to the golf ball by forming a layer of the golf ball, typically a core layer, with a blend of at least 2 highly neutralized acid polymers, each of which has a low flexural modulus. The golf ball thus produced has good flight characteristics and provides good control. The inventors also have discovered that a golf ball comprising a blended highly neutralized acid polymer layer can be customized by controlling the proportions of the highly neutralized acid polymers used to form the blend in response to a user's preferences and requirements.

For convenience, embodiments of the invention will be described with detail as they relate to 2-component blends. However, the invention relates to ternary, quaternary, and higher order blends. With the description provided herein, the skilled practitioner will be able to apply the subject matter of the invention to blends of any number of components.

Figure 1:
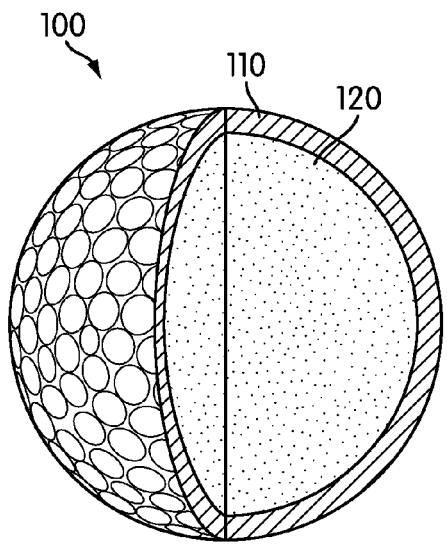
FIG. 1 shows a representative golf ball in accordance with this disclosure having a two-piece construction comprising a core layer and a cover layer.

FIG. 1 shows a golf ball 100 in accordance with a first embodiment of the present disclosure. Golf ball 100 is a two piece golf ball. Specifically, golf ball 100 includes cover layer 110 substantially surrounding core layer 120. In golf ball 100, core layer 120 may be made of a blend of highly neutralized acid polymers.

Figure 2:
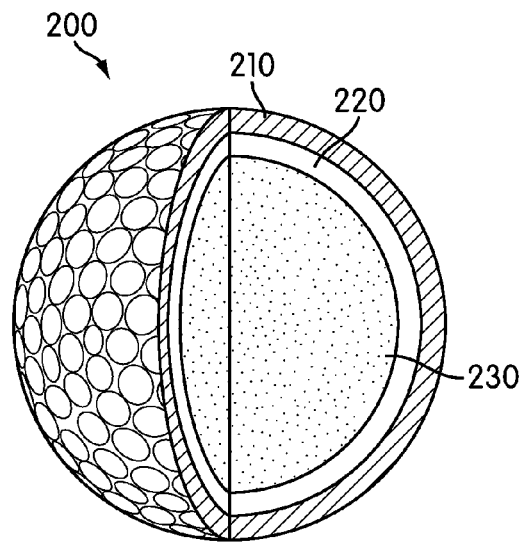
FIG. 2 shows a second representative golf ball in accordance with this disclosure having a three-piece construction comprising a core layer, a mantle layer, and a cover layer.

FIG. 2 shows a golf ball 200 in accordance with a second embodiment of the present disclosure. Golf ball 200 includes core layer 230, mantle layer 220 substantially surrounding core layer 230, and cover layer 210 substantially surrounding mantle layer 220. In some embodiments, both mantle layer 220 and core layer 230 may comprise blended highly neutralized acid polymers.

Figure 3:
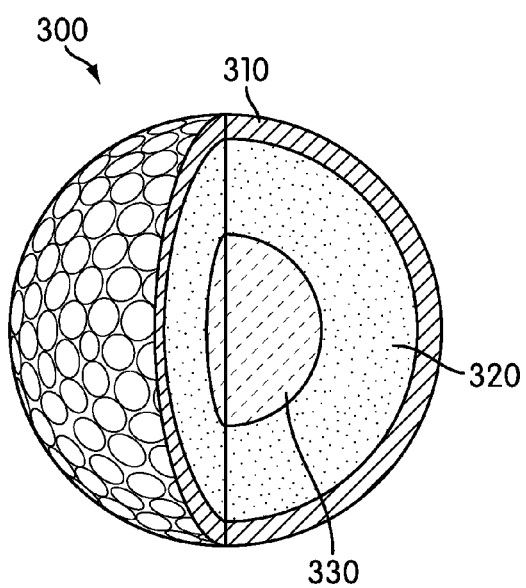
FIG. 3 shows a third representative golf ball in accordance with this disclosure having a three-piece construction comprising a core layer, a mantle layer, and a cover layer.

FIG. 3 shows a golf ball 300 in accordance with a third embodiment of the present disclosure. Golf ball 300 includes core layer 330, mantle layer 320 substantially surrounding core layer 330, and cover layer 310 substantially surrounding mantle layer 320. In some embodiments, core layer 330 and mantle layer 320 may comprise blended highly neutralized acid polymers.

Figure 4:
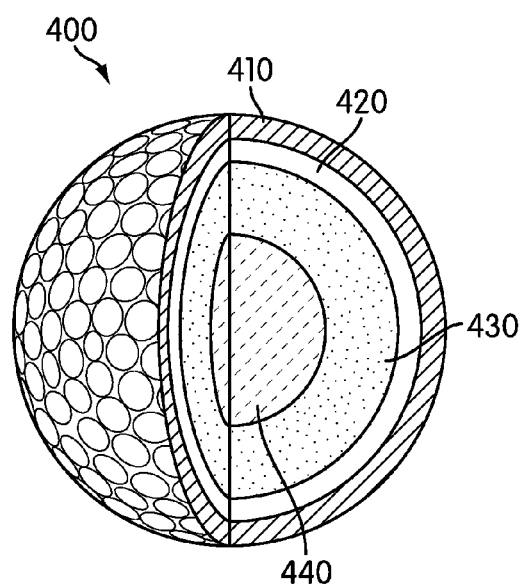
FIG. 4 shows a fourth representative golf ball in accordance with this disclosure having a four piece construction comprising a core layer, an intermediate layer, a mantle layer, and an outer cover layer.

FIG. 4 shows a golf ball 400 in accordance with a fourth embodiment of the present disclosure. Golf ball 400 includes core layer 440, intermediate layer or outer core layer 430 substantially surrounding core layer 440, mantle layer 420 substantially surrounding intermediate/outer core layer 430, and cover layer 410 substantially surrounding mantle layer 420. In some embodiments, any or all of mantle layer 420, intermediate/outer core layer 430, and core layer 440 can comprise blended highly neutralized acid polymers.

Thus, each of these types of golf balls can be made in accordance with the method disclosed herein. The layers also may be identified by different names. For example, in FIG. 4, the layers may be labeled as core layer 440, mantle layer 430, second mantle layer 420, and cover layer 410. In another alternative, layer 420 also may be called "inner cover layer" 420. Also, golf balls with additional layers, such as 5 or more layers, can be made in accordance with the method disclosed herein. Except as otherwise discussed herein below, any golf ball discussed herein may generally be any type of golf ball known in the art. Namely, unless the present disclosure indicates to the contrary, a golf ball may generally be of any construction conventionally used for golf balls, such as a regulation or non-regulation construction. Regulation golf balls are golf balls which meet the Rules of Golf as approved by the United States Golf Association (USGA). Golf balls discussed herein may also be made of any of the various materials known to be used in golf ball manufacturing, except as otherwise noted.

Furthermore, it is understood that any feature disclosed herein (including but not limited to various embodiments shown in the FIGS. and various chemical formulas or mixtures) may be combined with any other features disclosed here, as may be desired.

Typically, embodiments are directed to golf balls having a core layer comprising blended highly neutralized acid polymers. More typically, the core layer of a golf ball comprises blended highly neutralized acid polymers having low flexural modulus. In particular, the core layer, or inner core layer, is made by injection molding. For convenience, embodiments of the invention will be described with particularity herein as they relate to such a three-piece or -layer golf ball. However, with the information and guidance provided herein, the skilled practitioner will be able to design balls having more or different layers.

An embodiment is directed to a three-piece golf ball comprising core layer 330, mantle layer 320 enclosing core layer 330, and cover layer 310 enclosing mantle layer 320. Core layer 330 comprises a blend comprising a first highly neutralized acid polymer having a first flexural modulus and a second highly neutralized acid polymer having a second flexural modulus.

Embodiments of the invention are directed to a four-piece ball comprising core layer 440, outer core layer 430, mantle layer or inner cover layer 420, and outer cover layer 410.

In embodiments of the invention, the low flexural modulus of highly neutralized acid polymer used to form the blend is less than about 45,000 psi. Typically, the low flexural modulus of each highly neutralized acid polymer is between about 1,000 psi and about 40,000 psi, and more typically between about 1,000 psi and about 35,000 psi. In other embodiments of the invention, the low flexural modulus is between about 1,000 psi and about 30,000 psi, typically between about 1,000 psi and about 25,000 psi, more typically between about 1,000 psi and about 20,000 psi, and even more typically between about 1,000 and about 15,000 psi. The proportions of each highly neutralized acid polymer in the blend are established to yield a blend having the pre-selected flexural modulus and resultant properties and characteristics, such as compression deformation and spin rate off driver and iron shots.

Any ratio of polymers that provides the desired result can be blended. The weight ratio of first highly neutralized acid polymer to second highly neutralized acid polymer typically is between about 10:90 and about 90:10. In one embodiment, the ratio of the first highly neutralized acid polymer to the second highly neutralized acid polymer is from about 20:80 to about 80:20. In another embodiment, the ratio is from about 30:70 to about 70:30, and in another embodiment, the ratio is from about 40:60 to about 60:40; in still another embodiment, the ratio is about 50:50.

The highly neutralized acid polymers may be combined by any method known to the skilled practitioner. For example, dry blending, such as in a Banbury mixer or a two-roll mixer, is suitable. Also, dynamic phase-change methods, such as compounding in an extruder, may be used to form the blend.

In embodiments of the invention, suitable highly neutralized acid polymers include, but are not limited to, HPF resins such as HPF1000, HPF2000, HPF AD1035, and HPF AD1040, all produced by E. I. Dupont de Nemours and Company. HPF1000 provides a combination of high resilience and low compression. HPF2000 provides a high COR and low compression. HPF AD1035 is a softer material than HPF2000, i.e., HPF AD1035 has a higher compression value than does HPF2000.

In embodiments, core layer 330 comprises a blend of highly neutralized acid polymers and optionally additives, fillers, and/or melt flow modifiers. The acid polymer typically is neutralized to 80% or higher, including up to 100%, with a suitable cation source, such as magnesium, sodium, zinc, or potassium. The cation source of first and second highly neutralized acid polymers may be the same or different.

Suitable additives and fillers include, for example, blowing and foaming agents, optical brighteners, coloring agents, fluorescent agents, whitening agents, UV absorbers, light stabilizers, defoaming agents, processing aids, nanofillers, antioxidants, stabilizers, softening agents, fragrance components, plasticizers, impact modifiers, acid copolymer wax, and surfactants; inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate, and the like; high specific gravity metal powder fillers, such as tungsten powder, molybdenum powder, and the like; and regrind, i.e., core material that is ground and recycled.

Suitable melt flow modifiers include, for example, fatty acids and salts thereof, polyamides, polyesters, polyacrylates, polyurethanes, polyethers, polyureas, polyhydric alcohols, and combinations thereof.

Each of the compounds discussed herein for any particular embodiment may be mixed and matched with any other specific embodiment of another compound according to the description herein. Furthermore, any compound may generally be used in combination with other compounds of the same type, such that any list herein includes mixtures thereof, unless otherwise specified.

Often, core layer 330 of embodiments of the invention has a specific gravity between about 0.85 to about 1.1, typically between about 0.9 and about 1.1. In embodiments, the specific gravity is adjusted to adjust the moment of inertia (MOI) to affect the spin rate of the ball. Lowering the specific gravity of the core layer to a value less than about the specific gravities of the outer layers will increase the MOI and reduce the spin rate. Thus, in some embodiments of the invention, the specific gravity of core layer 330 is less than the specific gravities of mantle layer 320 and cover layer 310. Alternatively, increasing the specific gravity of the core layer decreases the MOI and increases the spin rate. With the information and guidance provided herein, the skilled practitioner can select a specific gravity of the blend to provide a desired MOI and can control the specific gravities of the highly neutralized acid polymers in the blend to form a golf ball having pre-selected properties and characteristics.

In embodiments in which core layer 330 has a high resilience, the golf ball will have a good flight performance. In embodiments of the invention, therefore, core layer 330 typically has a COR value from about 0.785 to about 0.90, more typically from about 0.79 to about 0.89, and even more typically from about 0.795 to about 0.88. In some embodiments, core layer 330 has a first coefficient of restitution, golf ball 300 has a second coefficient of restitution, and the first coefficient of restitution is greater than the second coefficient of restitution, typically by at least about 0.01.

Core layer 330 typically is made by an injection molding process, although a compression molding process may also be used. During an injection molding process, the temperature of the injection machine typically is set in a range of about 190° C. to about 220° C.

The skilled practitioner recognizes that highly neutralized acid polymers are hygroscopic. Therefore, the first and second highly neutralized acid polymers, and a blend thereof, should be kept in a moisture-resistant packaging or should be treated with a dry gas, typically air, to reduce the moisture level. Moisture in the polymers likely will cause voids in the product. Drying conditions for first and second highly neutralized acid polymers typically require 2 to 24 hours of dry air flow at a temperature below about 50° C. Moisture levels greater than 2,000 ppm in the highly neutralized acid polymer may make it necessary to employ vacuum as well as heat to remove moisture. The moisture level should be no more than about 1,000 ppm for production of products free from defects caused by moisture.

In embodiments of the invention, the diameter of core layer 330 may be in a range of from about 19 mm to about 34 mm, or from about 21 mm to about 30 mm, or, more typically, from about 23 mm to about 28 mm.

Core layer 330 typically has a compression deformation value in a range of from about 3 mm to about 5.5 mm. In some embodiments, core layer 330 has a compression deformation value in a range of from about 3.5 mm to about 5 mm. Further, core layer 330 has a surface Shore D hardness of from 40 to 60 at any single point on a cross-section obtained by cutting core layer 330 in half, and has a Shore D cross-sectional hardness difference between any two points on the cross-section of within ±6. This hardness condition ensures that the golf ball will exhibit stable performance. In some embodiments, the hardness difference between any two points on the cross-section is within ±3.

Mantle layer 320 typically is formed of thermoset materials, typically by crosslinking a polybutadiene rubber composition. When other rubber is used in combination with a polybutadiene, it is typical that polybutadiene is included as a principal component. Specifically, a proportion of polybutadiene in the entire base rubber typically is equal to or greater than about 50 percent by weight, and more typically is equal to or greater than about 80 percent by weight. A polybutadiene having a proportion of cis-1,4 bonds of equal to or greater than about 60 mol percent, and further, equal to or greater than about 80 mol percent, is most typical.

In some embodiments, cis-1,4-polybutadiene may be used as the base rubber and mixed with other ingredients. In some embodiments, the amount of cis-1,4-polybutadiene may be at least about 50 parts by weight, based on 100 parts by weight of the rubber compound.

Various additives may be added to the base rubber to form a compound. The additives may include a cross-linking agent and a filler. In some embodiments, the cross-linking agent may be zinc diacrylate, magnesium acrylate, zinc methacrylate, or magnesium methacrylate. In some embodiments, zinc diacrylate may provide advantageous resilience properties.

The filler may be used to increase the specific gravity of the rubber compound. The filler may include zinc oxide, barium sulfate, calcium carbonate, or magnesium carbonate. In some embodiments, zinc oxide may be selected for its advantageous properties. Metal powder, such as tungsten, may alternatively be used as a filler to achieve a desired specific gravity. In some embodiments, the specific gravity of mantle layer 320 may be from about 1.05 to about 1.45. In some embodiments, the specific gravity of mantle layer 320 may be from about 1.05 to about 1.35.

In some embodiments, a polybutadiene synthesized using a rare earth element catalyst may be used. In some embodiments, rare earth element catalysis of the polybutadiene reaction is typical. Excellent resilience performance of a golf ball may be achieved by using this polybutadiene. Examples of rare earth element catalysts include lanthanum series rare earth element compounds. Other catalysts may include an organoaluminum compound, an alumoxane, and halogen containing compounds. A lanthanum series rare earth element compound is typical. Polybutadiene obtained by using lanthanum series rare earth-based catalysts usually employs a combination of lanthanum series rare earth (atomic number of 57 to 71) compounds, but particularly typical is a neodymium compound.

In some embodiments, the polybutadiene rubber composition may comprise at least from about 0.5 parts by weight to about 5 parts by weight of a halogenated organosulfur compound. In some embodiments, the polybutadiene rubber composition may comprise at least from about 1 part by weight to about 4 parts by weight of a halogenated organosulfur compound. The halogenated organosulfur compound is selected from the group consisting of pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol; 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenol; pentabromothiophenol; 2-bromothiophenol; 3-bromothiophenol 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; and their zinc salts and other metal salts thereof, and mixtures thereof.

Mantle layer 320 typically is made by compression molding. Suitable vulcanization conditions include a vulcanization temperature of between about 130° C. and about 190° C. and a vulcanization time of between about 5 and about 20 minutes. To obtain the desired rubber crosslinked body for use as a layer, particularly mantle layer 320, of the golf ball described herein, the vulcanization temperature is preferably at least about 140° C.

Typically, mantle layer 320 has a surface Shore D hardness of from 50 to 60, and the surface hardness of mantle layer 320 is higher than the surface hardness of core layer 330.

When mantle layer 320 is produced by vulcanizing and curing the rubber composition in the above-described way, advantageous use may be made of a method in which the vulcanization step is divided into two stages: first, the mantle layer material is placed in a mantle layer-forming mold and subjected to an initial vulcanization so as to produce a pair of semi-vulcanized hemispherical cups, following which a prefabricated core layer is placed in one of the hemispherical cups and is covered by the other hemispherical cup, in which state complete vulcanization is carried out.

The surface of core layer 330 placed in the hemispherical cups may be roughened before the placement to increase adhesion between core layer 330 and mantle layer 320. In some embodiments, the core surface may be pre-coated with an adhesive or pre-treated with chemical(s) before placing core layer 330 in the hemispherical cups to enhance the durability of the golf ball and enable a high rebound.

Cover layer 310 of golf ball 300 has a thickness of from about 0.5 mm to about 2 mm. In some embodiments, cover layer 310 of the present disclosure has a thickness of from about 0.8 mm to about 2 mm. In other embodiments, cover layer 310 has a thickness of from about 1 mm to about 1.5 mm.

In some embodiments, cover layer 310 has a Shore D hardness as measured on the curved surface of from about 45 to about 75. In some embodiments, cover layer 310 of golf ball 300 has a Shore D hardness as measured on the curved surface from about 50 to about 70.

Typically, cover layer 310 may comprise a thermoplastic material. The thermoplastic material is selected from the group consisting of ionomer resin, highly neutralized acid polymers, polyamide resin, polyurethane resin, polyester resin, and blends thereof. More typically, cover layer 310 comprises a thermoplastic material selected from the group consisting of ionomer resin, polyurethane resin, highly neutralized acid polymer, and blends thereof. Inner cover layer or second mantle layer 420 also may comprise a thermoplastic material.

Other properties may be desirable for golf ball 300. In some embodiments, it may be desirable for golf ball 300 to have a moment of inertia between about 82 g-cm$^2$ and about 90 g-cm$^2$. Such a moment of inertia may produce a desirable distance and trajectory, particularly when golf ball 300 is struck with a driver or driven against the wind.

Typically, golf ball 300 will have a compression deformation of about 2.2 mm to about 4 mm. In some embodiments, golf ball 300 has compression deformation of about 2.5 mm to about 3.5 mm. In some embodiments, golf ball 300 has compression deformation of about 2.5 mm to about 3 mm.

In some embodiments, the layers used to make golf ball 300 may have a specified relationship in terms of their respective physical properties. For example, for a greater moment of inertia, ball layers have a specific gravity gradient, increasing from the core layer to the cover layer. In particular, in some embodiments of the invention, core layer 330 has a first specific gravity; mantle layer 320 has a second specific gravity greater than the first specific gravity, typically by at least about 0.01; and cover layer 310 has a third specific gravity that is greater than the second specific gravity, typically by at least about 0.01.

Golf balls can be customized to meet a golfer's requirements. The inventor's discovery has made it possible to provide 'on demand' a golf ball that improves rather than degrades the user's performance. The properties and characteristics of the golf ball are adjusted to suit the golfer's specified flexural modulus, driver spin, iron spin, compression deformation, or any other properties and characteristics of a golf ball that is related to the relative proportions of highly neutralized acid polymers in a layer, typically a core layer.

There are objective and subjective approaches to identifying properties and characteristics of a preferred golf ball design. For example, the golfer can be questioned about preferences for a balance between distance and control, and this information can be used in combination with the golfer's handicap and description of his swing, for example. The golf ball fitting also can consider playing conditions. Also, the golfer's performance can be evaluated by a trained observer. For example, the golfer's swings with the various club types could be observed. Professional players often use a combination of these techniques.

There also exists a method and system that significantly reduces or even eliminates the need for expert involvement in the process of golf ball customization. One such system is disclosed in co-pending U.S. application Ser. No. 61/512, 583, entitled "Method and System for Developing a Golf Ball Design", filed on Jul. 28, 2011, the entirety of which is hereby incorporated by reference.

In accordance with an embodiment of the invention, a golf ball design is specified for execution by a computer. A plurality of golf swing parameter values is obtained. A range of values is calculated for each of a plurality of golf ball design characteristics, the calculation of each range of values being based upon a corresponding value from the plurality of golf swing parameter values. The range of values for each of the plurality of golf ball design characteristics is combined to delimit a range of golf ball designs. In another step, the method includes inputting a golf ball design preference. In another step, the method includes reducing the range of golf ball designs based upon the golf ball design preference. A correlation is developed between the properties and characteristics of a ball and proportions of highly neutralized acid polymers, particularly in a core layer.

EXAMPLES

Golf balls having a core layer, an outer core layer, a mantle layer, and an outer cover layer, were made and evaluated. The core layer was formed by blending HPF 2000 and HPF AD1035 in the proportions set forth in Table I, together with barium sulfate. The outer core layer of each ball was the same and comprised butadiene rubber and other ingredients, as summarized in Table I. One type of TPU was used for the mantle layer, and another type of TPU was used for the cover layer of each ball. Each ball had 360 dimples.

The compositions of the layers are summarized in Table I.

TABLE I

| Layer | | | Ball 1 | Ball 2 | Ball 3 |
|---|---|---|---|---|---|
| Core | Components | HPF 2000 | 70 | 50 | 25 |
| | | AD1035 | 30 | 50 | 75 |
| | | BaSO$_4$, phr | 3 | 3 | 3 |
| Outer core | Components | Butadiene Rubber | 100 | 100 | 100 |
| | | ZnO, phr | 9 | 9 | 9 |
| | | BaSO$_4$, phr | 5 | 5 | 5 |
| | | PO, phr | 1.6 | 1.6 | 1.6 |
| | | Zinc Diacrylate, phr | 31 | 31 | 31 |
| Mantle | Component | TPU | | 100 percent | |
| Cover | Component | TPU | | 100 percent | |
| | Dimples | | | 360 | |

As can be seen in Table II, golf ball 1 has a specific gravity gradient from core layer (lowest) to mantle layer (highest). The performance results observed in testing for these balls when tested in a standard manner is summarized in Table II. The performance data indicate that the properties and characteristics of the golf ball were adjusted by controlling the relative proportions of the two highly neutralized acid polymers in the core layer. In particular, Golf ball 2 exhibited lowest driver spin yet highest 6-iron spin. All golf balls showed essentially identical spin on wedge shots.

TABLE II

| Layer | | Units | Golf ball 1 | Golf ball 2 | Golf ball 3 |
|---|---|---|---|---|---|
| Core | Diameter | mm | 24.66 | | |
| | Weight | g | 8.25 | | |
| | Compression | mm | 3.44 | 3.66 | 3.72 |
| | Specific gravity of layer | | 1.05 | | |
| Outer Core | Diameter | mm | 38.53 | | |
| | Weight | g | 33.44 | | |
| | Compression | mm | 2.86 | 2.86 | 2.87 |
| | Specific gravity of layer | | 1.14 | | |
| Mantle | Diameter | mm | 40.48 | | |
| | Weight | g | 39.08 | | |
| | Compression | mm | 2.56 | 2.60 | 2.64 |
| | Specific gravity of layer | | 1.17 | | |
| Ball | Diameter | mm | 42.74 | | |
| | Weight | g | 45.74 | | |
| | Compression | mm | 2.62 | 2.62 | 2.66 |
| | Shore D | | 56 | 55 | 54 |
| Cover | Specific gravity of layer | | 1.08 | | |
| Result of strike with club | | | | | |
| Driver | Club head Speed | mph | Approximately 120 | | |
| | Initial Velocity | mph | 176 | 176 | 177 |
| | Launch Angle | deg | 9.4 | 9.4 | 9.6 |
| | Spin | rpm | 3663 | 3603 | 3696 |
| 6 Iron | Club head Speed | mph | Approximately 74 | | |
| | Initial Velocity | mph | 101 | 102 | 102 |
| | Launch Angle | deg | 22.2 | 21.7 | 22.5 |
| | Spin | rpm | 7336 | 7370 | 7191 |
| Wedge 54° | Club head Speed | mph | Approximately 45 | | |
| | Initial Velocity | mph | 49 | 49 | 49 |
| | Launch Angle | deg | 35 | 34.9 | 35.4 |
| | Spin | rpm | 7285 | 7287 | 7286 |

The data in Table II illustrate the subject matter of the invention, particularly how the golf ball properties and characteristics, such as driver spin and iron spin and compression deformation of the core layer and of the golf ball, can be adjusted by controlling the relative proportions of the highly neutralized acid polymers.

As used herein, unless otherwise noted, compression deformation, hardness, COR, and flexural modulus, are measured as follows:

Compression deformation: The compression deformation herein indicates the deformation amount of a golf ball, or a portion thereof, under a force. Specifically, when the force is increased to 130 kg from 10 kg, the deformation amount of the golf ball, or a portion thereof, under a force of 130 kg, less the deformation amount of the golf ball, or a portion thereof, under a force of 10 kg, is the compression deformation value. For example, a golf ball that deforms 0.5 mm under a 10 kg force and 5.0 mm under a 130 kg force has a compression deformation of 4.5 mm.

Hardness: Hardness of golf ball layer is measured generally in accordance with ASTM D-2240, but is measured on the land area of a curved surface of a molded golf ball.

Method of measuring COR: A golf ball, or part thereof, is fired by an air cannon at a steel plate positioned about 1.2 meters away from the air cannon at an initial velocity of 40 m/sec. A speed monitoring device is located over a distance of 0.6 to 0.9 meters from the cannon. After striking the plate, the golf ball, or part thereof, rebounds through the speed-monitoring device. The return velocity divided by the initial velocity is the COR.

Flexural modulus: Measured in accordance with ASTM D-790.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A golf ball comprising:
a core layer;
a layer adjacent to and essentially enclosing the core layer; and
a cover layer essentially enclosing the layer adjacent to the core layer;
wherein the core layer comprises a blend comprising a first highly neutralized acid polymer having a first flexural modulus of 86 MPa (12 Kpsi) and a second highly neutralized acid polymer having a second flexural modulus of 50.3 MPa (7.3 Kpsi) wherein a relative proportion of the first highly neutralized acid polymer to the second highly neutralized acid polymer is between about 40:60 and about 60:40 and
wherein the core layer has a compression deformation between about 3.5 mm to about 5.5 mm.

2. The golf ball of claim 1, wherein the core layer has a specific gravity between about 0.85 and about 1.1.

3. The golf ball of claim 1, wherein the core layer has a COR between about 0.785 and about 0.90.

4. The golf ball of claim 3 wherein the core layer has a COR about 0.01 greater than a COR of the golf ball.

5. The golf ball of claim 1, wherein the core layer has a diameter of from about 19 mm to about 34 mm.

6. The golf ball of claim 1, wherein the core layer has a Shore D cross-sectional hardness of from 40 to 60 at any single point on a cross-section obtained by cutting the core layer in half, and has a Shore D cross-sectional hardness difference between any two points on the cross-section of within ±6 Shore D units.

7. The golf ball of claim 1, wherein the layer adjacent to the core layer comprises polybutadiene rubber.

8. The golf ball of claim 7, wherein the layer adjacent to the core layer has a specific gravity between about 1.05 and about 1.45.

9. The golf ball of claim 1, wherein the golf ball has a compression deformation of between about 2.2 mm and about 4 mm.

10. The golf ball of claim 1, further comprising an intermediate layer or an inner cover layer between the layer adjacent to the core layer and the cover layer.

11. The golf ball of claim 1, wherein the layers of the golf ball have a specific gravity gradient that increases from core layer to cover layer.

12. The golf ball of claim 10, wherein the layers of the golf ball have a specific gravity gradient that increases from core layer to cover layer.

13. The golf ball of claim 12 wherein the core layer has a COR between about 0.785 and about 0.90.

14. The golf ball of claim 12 wherein the core layer has a compression deformation between about 3 mm to about 5.5 mm.

15. The golf ball of claim 12, wherein the golf ball has a compression deformation of between about 2.2 mm and about 4 mm.

16. The golf ball of claim 1, wherein the core layer surface has been coated with an adhesive.

* * * * *